United States Patent
Lv et al.

(10) Patent No.: US 10,648,123 B2
(45) Date of Patent: May 12, 2020

(54) HEATING CONTROL METHOD OF A MULTI-DRUM WASHING MACHINE

(71) Applicant: QINGDAO HAIER DRUM WASHING MACHINE CO., LTD., Laoshan, Qingdao, Shandong (CN)

(72) Inventors: Peishi Lv, Shandong (CN); Wenwei Li, Shandong (CN); Jinkai Wang, Shandong (CN); Jun Wu, Shandong (CN); Yuanyuan Chang, Shandong (CN)

(73) Assignee: QINGDAO HAIER DRUM WASHING MACHINE CO., LTD., Qingdao, Shandong (CN)

( * ) Notice: Subject to any disclaimer, the term of this patent is extended or adjusted under 35 U.S.C. 154(b) by 266 days.

(21) Appl. No.: 15/534,883

(22) PCT Filed: Aug. 31, 2015

(86) PCT No.: PCT/CN2015/088590
§ 371 (c)(1),
(2) Date: Jun. 9, 2017

(87) PCT Pub. No.: WO2016/090968
PCT Pub. Date: Jun. 16, 2016

(65) Prior Publication Data
US 2017/0342638 A1    Nov. 30, 2017

(30) Foreign Application Priority Data
Dec. 12, 2014  (CN) .......................... 2014 1 0766842

(51) Int. Cl.
*D06F 39/04*   (2006.01)
*D06F 33/02*   (2006.01)
(Continued)

(52) U.S. Cl.
CPC ............ *D06F 39/045* (2013.01); *D06F 25/00* (2013.01); *D06F 29/00* (2013.01); *D06F 31/00* (2013.01);
(Continued)

(58) Field of Classification Search
CPC ........ D06F 33/02; D06F 39/04; D06F 39/045; D06F 58/26
See application file for complete search history.

(56) References Cited

U.S. PATENT DOCUMENTS

| 8,015,646 B2 | 9/2011 | Lee et al. |
| 2008/0022465 A1* | 1/2008 | Jun ......................... D06F 31/00 8/158 |

(Continued)

FOREIGN PATENT DOCUMENTS

| CN | 101113557 A | 1/2008 |
| CN | 101153455 A | 4/2008 |

(Continued)

OTHER PUBLICATIONS

International Search Report (PCT/ISA/210) dated Dec. 15, 2015, by the Chinese Patent Office as the International Searching Authority for International Application No. PCT/CN2015/088590.

*Primary Examiner* — Joseph L. Perrin
(74) *Attorney, Agent, or Firm* — Buchanan Ingersoll & Rooney PC

(57) ABSTRACT

A washing machine comprises a first washing drum with a first heater and a second washing drum with a second heater. Before the first washing drum performs a heating procedure, it is necessary to determine whether the second washing drum is performing the heating procedure; if not, the first washing drum performs the heating procedure; if yes, it is necessary to determine whether the remaining heating time of the second washing drum is less than a set value, T min; if yes, the first washing drum pauses the heating procedure;

(Continued)

when the second washing drum finishes performing the heating procedure, the first washing drum then performs the heating procedure; if not, remaining heating time of the first washing drum and that of the second washing drum are determined, whichever drum having the shorter remaining heating time performs the heating procedure first, while the other drum performs the heating procedure second.

19 Claims, 5 Drawing Sheets

(51) Int. Cl.
| | | |
|---|---|---|
| *D06F 29/00* | (2006.01) | |
| *D06F 33/00* | (2020.01) | |
| *D06F 31/00* | (2006.01) | |
| *D06F 25/00* | (2006.01) | |
| *D06F 37/02* | (2006.01) | |
| *D06F 58/26* | (2006.01) | |
| *D06F 58/30* | (2020.01) | |
| *D06F 58/38* | (2020.01) | |
| *D06F 101/14* | (2020.01) | |
| *D06F 103/38* | (2020.01) | |
| *D06F 105/28* | (2020.01) | |

(52) U.S. Cl.
CPC .............. *D06F 33/00* (2013.01); *D06F 37/02* (2013.01); *D06F 39/04* (2013.01); *D06F 58/26* (2013.01); *D06F 58/30* (2020.02); *D06F 58/38* (2020.02); *D06F 2101/14* (2020.02); *D06F 2103/38* (2020.02); *D06F 2105/28* (2020.02); *D06F 2202/04* (2013.01); *D06F 2202/12* (2013.01); *D06F 2204/04* (2013.01); *D06F 2220/00* (2013.01)

(56) References Cited

U.S. PATENT DOCUMENTS

| | | |
|---|---|---|
| 2008/0052950 A1 | 3/2008 | Park et al. |
| 2010/0138055 A1 | 6/2010 | Jun et al. |
| 2011/0041258 A1* | 2/2011 | Ko .................... D06F 29/00 8/137 |
| 2012/0047661 A1* | 3/2012 | Hong .................. D06F 33/02 8/137 |

FOREIGN PATENT DOCUMENTS

| | | |
|---|---|---|
| CN | 102203337 A | 9/2011 |
| WO | WO 2011/057955 A1 | 5/2011 |

* cited by examiner

HEATING CONTROL METHOD OF A MULTI-DRUM WASHING MACHINE

FIELD OF THE INVENTION

The present disclosure relates to a washing machine and a control method of a washing machine in a field of washing, the washing machine has a plurality of washing drums for washing clothes according to different ways based on the amount and type of clothes, and relates to a washing water heating control method of the multi-drum washing machine.

BACKGROUND OF THE INVENTION

The washing machine performs cleaning, rinsing and spinning-dehydrating operations in order to remove the stains attached to the the laundry using the interaction of the detergent with water. Dryer is another representative of the clothing treatment device, and it is a household appliance used for drying wet clothing and so on. Recently, household appliances with a combination of washing machines and dryers have been widely used.

With the improvement of people's quality of life, people's health awareness has gradually increased, especially in the family clothing washing, more and more people wash clothes separately. If using the existing washing machine to take multiple laundry, the laundry time is hard to meet the requirements of the users. If buying two or more washing machines to wash separately at the same time, it will not only bring a great waste of energy and water resources but also occupy a large space, which is not suitable for home use. Therefore, the use of multi-drum washing machine will meet the needs above and solve the problem of energy, water and space waste.

A reasonable double drums design is a top-bottom arrangement which is easy to save space. However, the power control problem of the washing machine comes along with the design. Especially when heating, drying and high-speed dehydration are operating at the same time, there will be an overload condition, which will seriously affect the use of the machine stability and life.

A Chinese patent No. CN200880124154.4 discloses a control method which emphasizes that the two drums are heated alternately or sequentially. However, due to the different washing procedures of the duel-drum washing machine, the heating times of the two washing drums are different. If the heating time required for one of the washing drums is longer, and when the washing drum is subjected to a washing heating process, the other washing drum is performing dehydration, drying processes. In this way, it still will lead to the occurrence of implementation two high-power procedures at the same time.

At the same time, the above-mentioned washing and heating control method, the control steps are relatively complicated. And the power control of duel-drum washing machine is not enough.

In the view of foregoing, the present disclosure is proposed.

SUMMARY OF THE INVENTION

An object of the present disclosure is to provide a heating control method of a multi-drum washing machine, so that the multi-drum washing machine can perform the heating procedure independently and stably.

The specific scheme adopted by the present disclosure for solving the problem mentioned above is: a heating control method of a multi-drum washing machine, the washing machine at least comprising a first washing drum provided with a first heater and a second washing drum provided with a second heater. Before the first washing drum performs a heating process, it is necessary to determine whether or not the second washing drum is performing a heating process. If no, the first washing drum performs the heating process, if yes, it is necessary to determine whether or not a remaining heating time of the second washing drum is smaller than a set value $T_{min}$.

If yes, the first washing drum pauses performing the heating process, and the first washing drum dose not perform the heating process until the heating process of the second washing drum is completed. If no, it is determined a remaining heating time of the first washing drum and the second washing drum. The washing drum having a shorter remaining heating time preferentially performs the heating process, and the other washing drum is followed to perform the heating process.

Further, when the first washing drum is performing the heating process, the second washing drum can't perform any one process of heating, dehydration and drying processes.

Further, it is necessary to determine whether or not the second washing drum is performing a dehydration process or a drying process after determining the second washing drum is not performing the heating process. If yes, the first washing drum pauses performing the heating process, and continues performing the heating process after the dehydration process or the drying process of the second washing drum is completed. If no, the first washing drum performs the heating process directly.

Further, when the first washing drum is performing the heating process, the second washing drum is performing the dehydration process. The first washing drum pauses performing the heating process and continues performing the heating process after the dehydration process and a followed drying process of the second washing drum are completed.

Further, when the remaining heating time of the first washing drum and the second washing drum are equal, it is necessary to determine whether or not the remaining heating time of the washing drums is greater than a set value $T_{max}$. If yes, an alternate heating process for alternately heating the first washing drum and the second washing drum is performed. If no, a sequential heating process, in which the second washing drum heats first, then the first washing drum heats, is performed.

Further, the alternate heating process is, the first washing drum and the second washing drum are alternately heated for certain time intervals. And after the completion of each time interval heating, it is determined whether or not the heating processes of the first washing drum and the second washing drum are completed. If the heating process of the first washing drum or the second washing drum is completed, the second washing drum or the first washing drum keeps heating until to the end. Otherwise, keeps alternately heating.

Further, a total heating time of the second washing drum is $T_{m2}$, the set value $T_{max}$ satisfies a following condition, $\frac{2}{3}T_{m2} \leq T_{max} \leq T_{m2}$. Preferably, the 10 min<$T_{max}$.

Further, a total heating time of the second washing drum is $T_{m2}$, the set value $T_{min}$ satisfies a following condition, $0 < T_{min} \leq \frac{1}{3}T_{m2}$. Preferably, the $0 < T_{min} \leq 5_{min}$.

Further, the heating time of the first washing drum or the second washing drum is the corresponding set value of the washing process performed by the corresponding washing drum. The washing machine times the heating process performed by the first washing drum or the second washing drum to obtain a heated time corresponding to the washing drum. And according to an equation, remaining heating time=total heating time−heated time, to obtain the remaining heating time of the first washing drum or the second washing drum.

Further, when the first washing drum is performing the heating process, it is determined whether the second washing drum is operating. If no, the first washing drum performs the heating process directly. If yes, it is determined whether the heating time of the first washing drum is close to a longest heating time of the first washing drum, thus, to determine whether or not the first washing drum is performing the heating process. The washing drum being operating means that it is performing water supply process, water replenishment process, washing process, rinsing process, drainage process, dehydration process, drying process and so on.

Further, a set heating temperature, a set water level and a heating time of the first washing drum are the set values of the washing process performed by the first washing drum. A set heating temperature, a set water level and a heating time of the second washing drum are the set values of the washing process performed by the second washing drum.

The benefits of the present disclosure are as follows:

1. The remaining heating time is determined before the heating process is performed on the washing drum, so that the washing drum having shorter remaining time is preferentially heated to shorten the waiting time of the user and improve the degree of humanization of the washing device.

2. Before the washing drum performs the heating process, it is determined whether or not another washing drum is performing a high-power process to avoid the occurrence of the high-power process being performed by the two washing drums at the same time. Thus reduces the abrasion of the washing machine and reduces the instantaneous power of the washing machine, and improves the applicable electric environment of the duel-drum washing machine.

3. The present disclosure has a simpler control logic, the control stability is relatively high in the actual washing program; and in the general washing case, it is possible to control the two drums to run the high-power program at different time and to reasonably control the heating time in the washing.

4. When the washing drum that is performing the heating program is about to end the heating process (the remaining heating time is less than the set value Tmin), in any case, it is necessary to give priority to the washing drum to continue performing the heating process to avoid the near completion of the heating process being interrupted, resulting in heat loss occur.

BRIEF DESCRIPTION OF THE DRAWINGS

The following is further described in details with embodiments of the present disclosure.

DETAILED DESCRIPTION OF THE INVENTION

Figure 1:
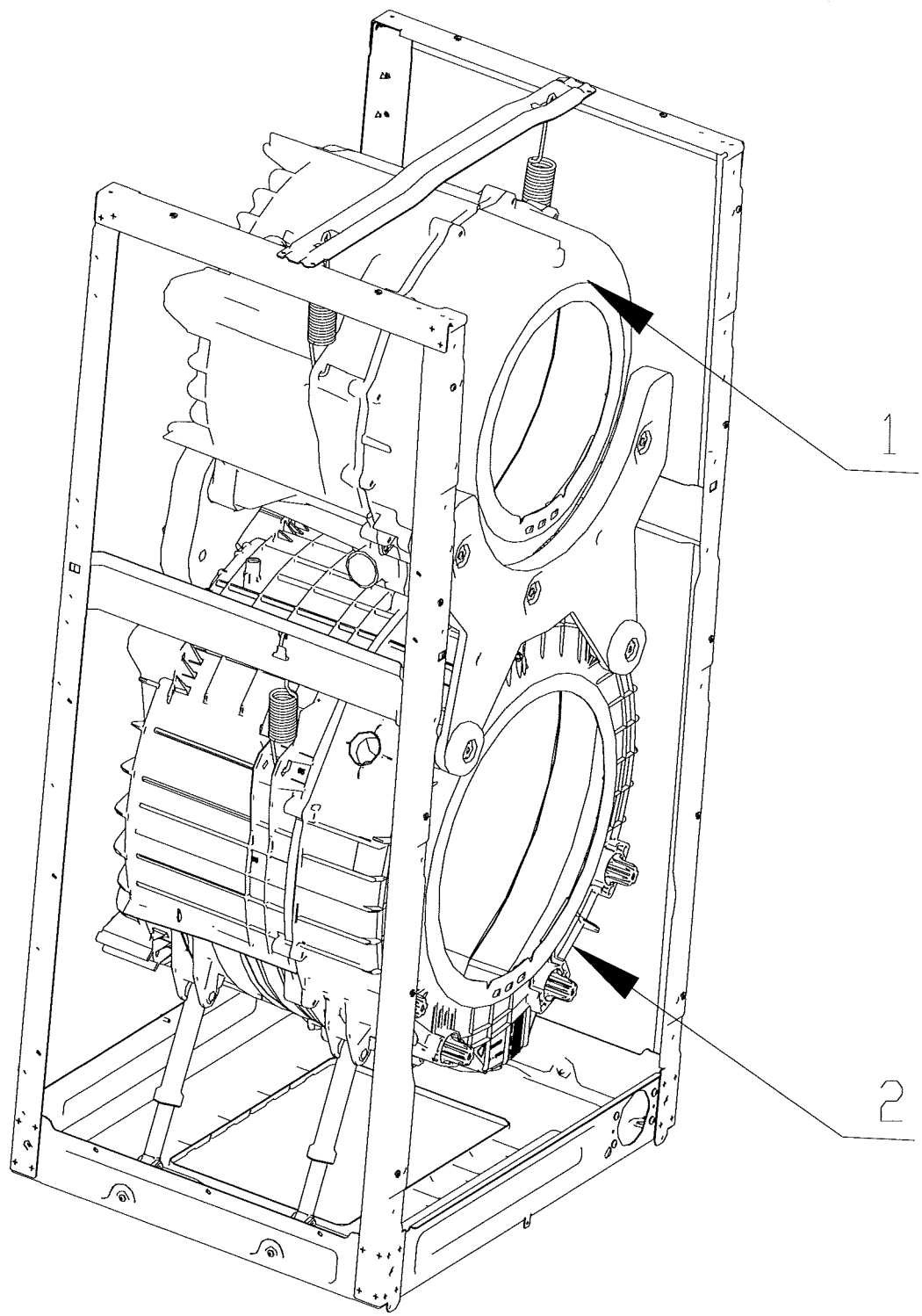
FIG. 1 is a structural diagram of a multi-drum washing machine of the present disclosure.

As shown in FIG. 1, a multi-drum washing machine, which at least provides with a first washing drum 1 and a second washing drum which can independently perform clothes washing. The first washing drum 1 and the second washing drum 2 can independently perform a washing process, a rinsing process, a dehydration process in turn to the clothes in order to achieve a goal of clothes washing. Preferably, the multi-drum washing machine further provides with a drying means to perform a drying process after the completion of the dehydration process on the first washing drum 1 and/or the second washing drum 2 to dry the clothes within.

In the present disclosure, the first washing drum 1 is provided with a first heater for heating the washing water therein, the second washing drum 2 is provided with a second heater for heating the washing water therein. Therefore, during the execution of the washing process, each heater heats the washing water in the corresponding washing drum to control the water temperature during the laundry washing process.

However, since the universal household cable can withstand less current. If the first washing drum and the second washing drum work at the same time, it will produce a larger load instantaneous current, resulting in the user's household distribution box trip, and even lead to cable burning. Therefore, it needs to arrange the high-power processes of the duel-drum washing machine at different stages, in order to avoid the occurrence of instantaneous high current. The high-power processes include the heating process, the dehydration process and the drying process and so on.

In order to avoid generating a large instantaneous current during the heating process of the washing machine, it is necessary that the second washing drum cannot simultaneously perform any of the processes in the heating, dehydration and drying processes when the heating program is performed in the first washing drum. Thus prevents the occurrence of the high-power process to be performed by the two washing drums of the washing machine at the same time.

Embodiment 1

The present embodiment describes a heating control method of a multi-drum washing machine as follows:

It is necessary to compare a remaining heating time of the second washing drum and a remaining heating time of the first washing drum before the first washing drum performs the heating process. The washing drum with a shorter remaining time has the priority to perform the heating process and the washing drum with a longer remaining time waits until the heating process of the washing drum with the priority is completed, and then continues performing the heating process.

Figure 2:
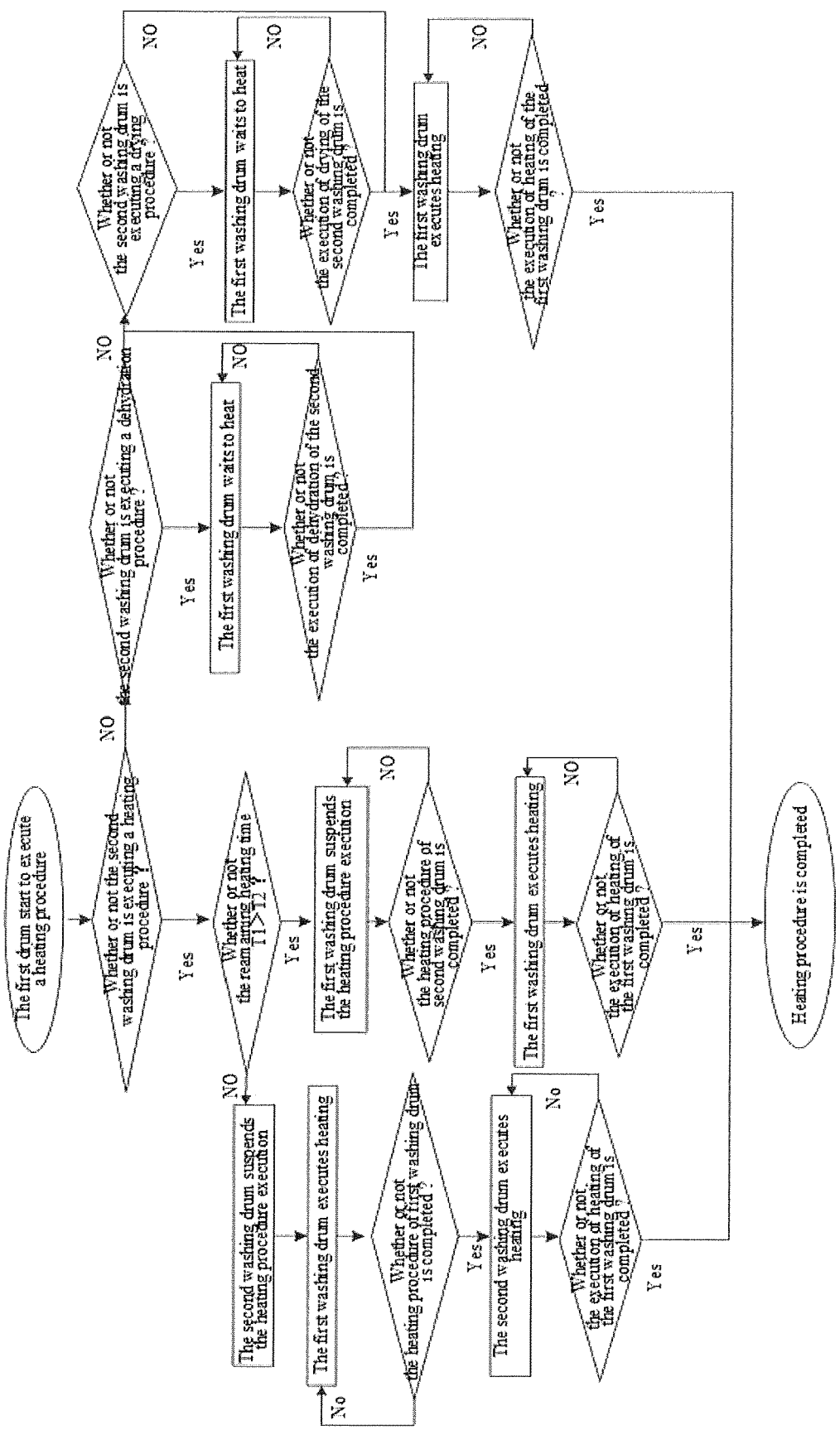
FIG. 2 is a flow chart of a washing heating process of the multi-drum washing machine of the present disclosure.

As shown in FIG. 2, in the present embodiment, the heating control method of the multi-drum washing machine is as follows:

1) Before the first washing drum performs a heating process;

2) It is determined whether the second washing drum is performing the heating process, if yes, executes step 8), if no, executes step 4);

3) It is determined a remaining heating time T1 of the first washing drum and a remaining heating time T2 of the second washing drum, if $T_1>T_2$, executes step 8), if $T_1<T_2$, executes step 9);

4) It is determined whether or not the second washing drum is performing a dehydration process,
if yes, executes step 5), if no, executes step 6);

5) The first washing drum stops performing the heating process until the dehydration process of the second washing drum is completed, executes step 6);

6) It is determined whether or not the second washing drum is performing the drying process,
if yes, executes step 7), if no, executes step 8);

7) The first washing drum stops performing the heating process until the drying process of the second washing drum is completed, executes step 8);

8) The first washing drum stops performing the heating process until the heating process of the second washing drum is completed, executes step 10);

9) The second washing drum stops performing the heating process, executes step 11);

10) The first washing drum executes the heating process until the heating process of the first washing drum is completed;

11) The first washing drum executes the heating process until the heating process of the first washing drum is completed and the second washing drum continues performing the heating process.

In the present embodiment, the heating time of the first washing drum is a set value corresponding to the washing process performed by the first washing drum. The heating time of the second washing drum is a set value corresponding to the washing process performed by the second washing drum.

In the present embodiment, the heating control methods of the first washing drum and the second washing drum are the same. The positions of the first washing drum and the second washing drum in from steps 1) to 11) can be exchanged to obtain a heating control method of the second washing drum.

In the present embodiment, the heating time of the first washing drum or the second washing drum is the set value corresponding to the washing process performed by the washing drum. The washing machine times the heating process performed by the first washing drum or the second washing drum to obtain a heated time. And according to an equation, remaining heating time=total heating time-heated time, it is obtained the remaining heating time of the first washing drum or the second washing drum In the present embodiment, the following special cases exist:

Special case 1, the remaining heating time of the first washing drum and the second washing drum is equal. At this time, it is necessary to determine whether or not the remaining heating time is bigger than the set value $T_{max}$.

If yes, according to the principle of alternating heating, an alternate heating process for alternately heating the first washing drum and the second washing drum is performed.

If no, according to the principle of sequential heating, a sequential heating process, in which the second washing drum is heated first, then the first washing drum is heated, is performed.

Further, the alternate heating process is, the first washing drum and the second washing drum are alternately heated for a certain time interval. And after the completion of heating for each time interval, it is determined whether or not the heating processes of the first washing drum and the second washing drum are completed. If the heating process of the first washing drum or the second washing drum is completed, the second washing drum or the first washing drum keeps heating until to the end. Otherwise, keeps alternately heating.

In the present embodiment, the total heating time of the second washing drum is $T_{m2}$. The set value $T_{max}$ satisfies a following condition, $\frac{2}{3}Tm2 \le T_{max} \le Tm2$. Preferably, 10 min$<T_{max}$. The set value $T_{min}$ satisfies a following condition, $0<T_{min}\le\frac{1}{3}T_{m2}$. Preferably, $0<T_{min}\le5$ min.

Further, the sequential heating process is, the washing drum performing earlier has the priority to perform in order to avoid the occurrence of heat loss caused by the interruption of the process.

Therefore, the second washing drum performing earlier is needed to continue performing the heating process. The first washing drum performing later pauses to perform until the heating process of the second washing drum is completed, and then performs the heating process.

Special case 2, the first washing drum needs to perform the heating process, and the second washing drum is performing the heating process and the remaining heating time of the second washing drum is shorter (no bigger that the set value $T_{min}$). At this time, due a relatively short waiting time, in order to reduce the heat loss, the first washing drum and then start the heating process after instructing the second washing drum to finish the heating process.

Therefore, the following steps are added on the basis of steps from 1) to 11):

Before the first washing drum performs the heating process, if the second washing drum is performing the heating process, it is necessary to determine whether or not the remaining heating time of the second washing drum is shorter than the shortest set value $T_{min}$.

If yes, the first washing drum pauses performing the heating process until the heating process of the second washing drum is completed, and the first washing drum continues performing the heating process.

If no, executes the step 2) of the present embodiment.

Embodiment 2

The present embodiment describes a heating control method of a multi-drum washing machine as follows:

Before the first washing drum performs the heating process, it is necessary to determine whether or not the second washing drum is performing the heating process, in order to avoid the first washing drum and the second washing drum performing the heating process at the same time and avoid the occurrence of the washing machine generating a large load current.

In the present embodiment, it is presumed that the first washing drum normally performs the heating process in advance so that the user places the laundry which is urgently to be washed into the first washing drum to shorten the waiting time for the user to wash the laundry.

And under the special situation that the heating time of the first washing drum needed is way too long, the second washing drum continues the process it performing and then the first washing drum has the priority to perform the heating process, in order to avoid the occurrence of the second washing drum waiting too long.

Preferably, a washing capacity of the first washing drum is smaller than a washing capacity of the second washing drum.

In the present embodiment, it is determined whether or not the heating time required for the first washing drum is too long by the following three judgment conditions:

11) Whether or not a set heating temperature of the first washing drum is higher than a common set temperature;

12) Whether or not a set water level of the first washing drum is larger than a common water level;

13) Whether or not the difference between the set heating temperature value and the actual measured value of the first washing drum is larger than the difference between the set heating temperature value and the actual measured value of the second washing drum.

If any one of the judgment conditions from 11) to 13) is yes, then the heating time of the first washing drum needed is too long.

If all the judgment conditions from 11) to 13) are no, then the heating time of the first washing drum needed is not too long.

Figure 3:
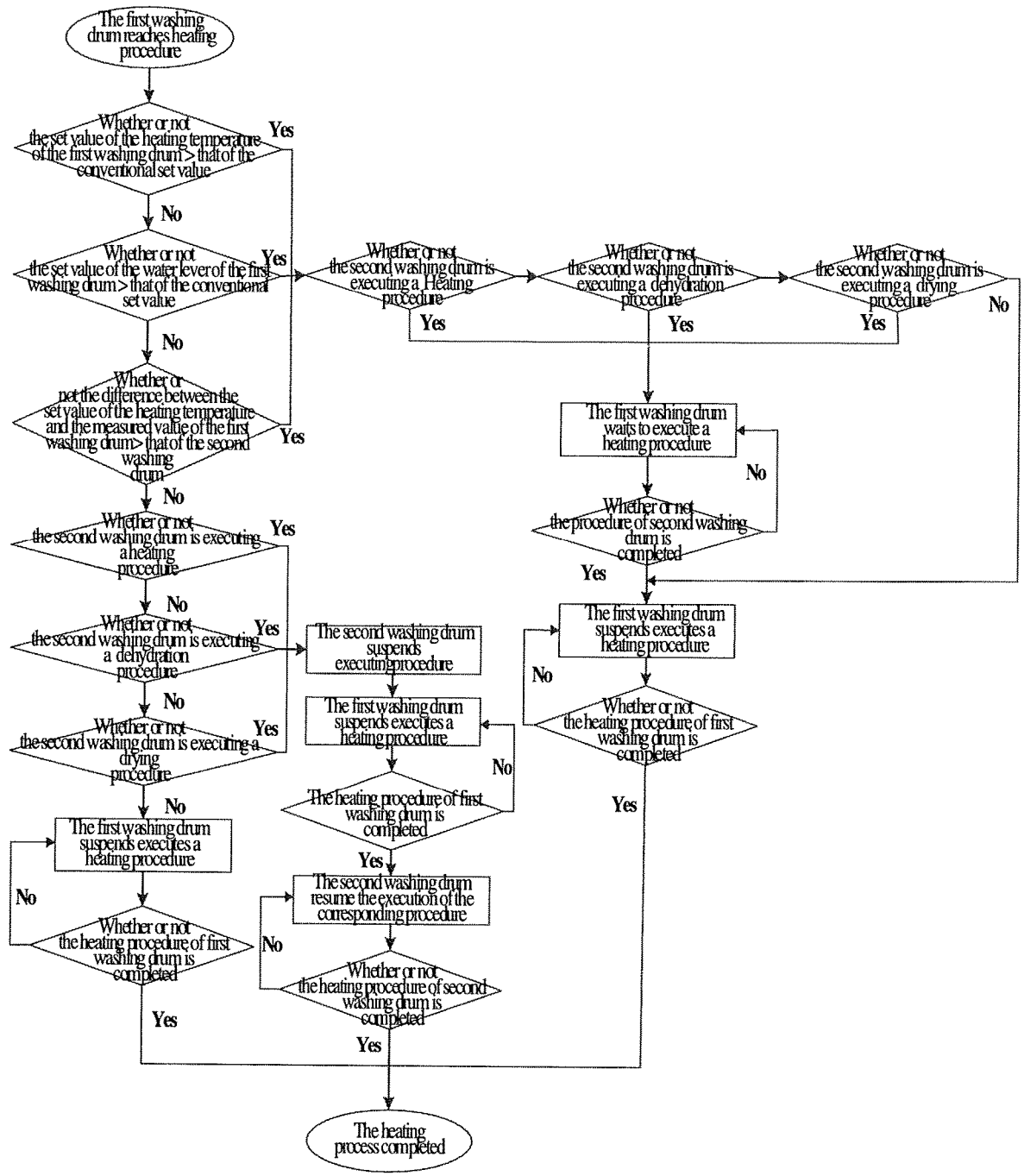
FIG. 3 is flow chart of a washing heating process of the multi-drum washing machine in another embodiment of the present disclosure.

As shown in FIG. 3, in the present embodiment, the heating control method of the multi-drum washing machine is as follows:

1) Before the first washing drum performs the heating process;

2) It is determined whether or not the set heating temperature t1 of the first washing drum is higher than the common set temperature t', if no, executes step 3), if yes, executes step 5);

3) It is determined whether or not the set water level Q1 is higher than the common water level Q', if yes, executes step 4), if no, executes step 5);

4) It is determined whether or not the difference between the set heating temperature T1 and the actual measured value t1n of the first washing drum is greater than the difference between the set heating temperature t2 and the actual measured value t2n of the second washing drum, if no, executes step 12), if yes, executes step 5);

5) It is determined whether or not the second washing drum is performing the heating process, if yes, executes step 8), if no, executes step 6);

6) It is determined whether or not the second washing drum is performing the dehydration process, if yes, executes step 9), if no, executes step 7);

7) It is determined whether or not the second washing drum is performing the drying process, if yes, executes step 10), if no, executes step 11);

8) The first washing drum pauses performing the heating process, the second washing drum continues performing the heating process; then the first washing drum does not perform the heating process until the heating process of the second washing drum is completed;

9) The first washing drum pauses performing the heating process, the second washing drum continues performing the dehydration process; not until the heating process of the second washing drum is completed, executes step 7);

10) The first washing drum pauses performing the heating process, the second washing drum continues performing the drying process; not until the heating process of the second washing drum is completed, executes step 11);

11) The first washing drum performs the heating process;

12) It is determined whether or not the second washing drum is performing the heating process, if yes, executes step 15), if no, executes step 13);

13) It is determined whether or not the second washing drum is performing the dehydration process, if yes, executes step 15), if no, executes step 14);

14) It is determined whether or not the second washing drum is performing the drying process, if yes, executes step 15), if no, executes step 16);

15) The second washing drum pauses performing the corresponding process, the first washing drum performs the heating process; not until the heating process of the first washing drum is completed, then the second washing drum continues performing the corresponding process;

16) The first washing drum performs the heating process.

In the present embodiment, the set heating temperature of the first washing drum is $t_1$, and the set water level $Q_1$ is the set value corresponding to the washing process performed by the first washing drum. The set heating temperature of the second washing drum is $t_2$, and the set water level $Q_2$ is the set value corresponding to the washing process performed by the second washing drum.

In the present embodiment, the common set temperature t' and common water level Q' are the required heating temperature and water level which obtained by several tests in the normal use of the washing machine. Preferably, the first washing drum is provided with a plurality of inlet water levels, and the common water level is the inlet water level which is more frequently used. The first washing drum is also provided with a plurality of heating gears, each of which is a set temperature value corresponding to be used more frequently, and a larger heating range. Further preferably, the water depth value of the washing water corresponding to the common water level is not greater than ½ diameter of the first washing drum, not less than ¼ diameter of the first washing drum.

For example, the first washing drum is provided with four inlet water levels which are 1, 2, 3, and 4. The water level from the level 1 to level 4 increases in turn. Preferably, the common water level Q' of the first washing drum is the inlet water level of level 3.

The first washing drum is provided with 5 heating gears, each gear corresponding to the set heating temperature of 30, 40, 50, 60 and 90 degrees Celsius. Preferably, the common set heating temperature t' of the first washing drum is 60 degrees Celsius.

In the present embodiment, the actual measured value t1n of the first washing drum and the actual measured value t2n of the second washing drum are the respective detection values obtained by performing real-time temperature detection or timing temperature detection on the washing water in the first washing drum and the second washing drum.

Thus, the first washing drum is designated as a priority drum for preferentially performing the heating process so that the user can put the laundry which is badly in need of washing into in the drum for washing and reduce the waiting time of the user. At the same time, the washing capacity of the first washing drum with respect to the second washing tub is smaller so as to normally use the small drum to preferentially perform the washing process and further reduce the waiting time for the user to wash the laundry being badly in need of washing. More specifically, before the prioritized washing drum performs the heating process, it is necessary to predetermine the heating time needed to take into account the special conditions requiring a longer washing heating time for the prioritized washing drum. Thus it is to avoid the occurrence of a longer waiting time for the other washing drum due to too long heating time, and to increase the degree of humanization of the washing apparatus.

Embodiment 3

The difference between the present embodiment and embodiment 1 is: before executing step 3) of embodiment 1, it is determined whether or not the heating time of the first washing drum needed is too long. If no, the second washing drum has priority to perform the heating process, and the first washing drum does not perform the heating process until the heating process of the second washing drum is completed. If yes, executes step 3), the heating process of the first washing drum is determined according to the principle of the washing drum having the shorter remaining time preferentially performing.

Thus, the first washing drum of the washing machine has priority to perform in the normal case. And in the special condition where the heating time of the first washing drum is too long, by determining the remaining heating time of the two washing drums, the washing drum having a small remaining heating time preferentially performs the heating process.

In the present embodiment, the method for determining whether or not the heating time needed for the first washing drum is too long is the same as that of the embodiment 2, and it is determined by the following three judgment conditions:

11) Whether or not the set heating temperature of the first washing drum is higher than a common set temperature;

12) Whether or not a set water level of the first washing tub is larger than a common water level;

13) Whether or not the difference between the set heating temperature value and the actual measured value of the first washing drum is larger than the difference between the set heating temperature value and the actual measured value of the second washing drum.

If any one of the judgment conditions from 11) to 13) is yes, then the heating time of the first washing drum needed is too long.

If all the judgment conditions from 11) to 13) is no, then the heating time of the first washing drum needed is not too long.

Embodiment 4

The differences between the present embodiment and the embodiments from 1 to 3 are: before the first washing drum performs the heating process, firstly executing the following determination. It is determined whether or not the second washing drum is operating. If no, the first washing drum performs the heating process directly; if yes, further executes step 2) in any one of embodiments from 1 to 3 to determine whether or not the first washing drum performs the heating process.

In the present embodiment, the washing drum being operating means that it is performing water supply process, water replenishment process, washing process, rinsing process, drainage process, dehydration process, drying process and so on.

Embodiment 5

In the present disclosure, the first washing drum 1 and the second washing drum 2 are communicated with a same inlet water pipe path through pipe path. The pipe path is provided with a control means for controlling the on and off of the water flow. Therefore, before executes the washing process, the washing water can be supplied into the first washing drum and/or the second washing drum through the inlet water pipe path.

However, due to a constant inlet water flow speed of the inlet water pipe path for the family use, when the first washing drum and the second washing drum supply water in the same time, the water flow speed is slower, which will lead to the occurrence of the first washing drum and the second washing drum not reaching the set water level. It also brings the problem that it cannot accurately determine the water level of the washing water in the first washing drum and the second washing drum due to the unstable speed of inlet water flow.

In order the avoid the situation described above, a constant or timing monitoring on the water amount or water level is taken during the washing process performed by the first washing drum and the second washing drum. Thus makes up the problem of water level decrease due to a lack of inlet water, and the water absorbed by the laundry, and replenishing washing water in time.

Meanwhile, when the first washing drum performs the water supply process, the second washing drum can perform neither the water supply process nor the water replenishment process at the same time. Also, when the second washing drum performs the water supply process, the first washing drum can perform neither the water supply process nor the water replenishment process at the same time. Thus, it can avoid the situation which the two drums supply water at the same time from happening.

The present embodiment describes a water replenishment control method of a multi-drum washing machine as follows.

When the first washing drum performs the water supply process and the water replenishment process, it is necessary to determine whether or not the second washing drum is performing the water supply process or the water replenishment process. Thus, it can avoid the situation which the two washing drums perform the water supply process or the water replenishment process at the same time from happening, and avoid lacking inlet water in the washing drum.

Figure 4:
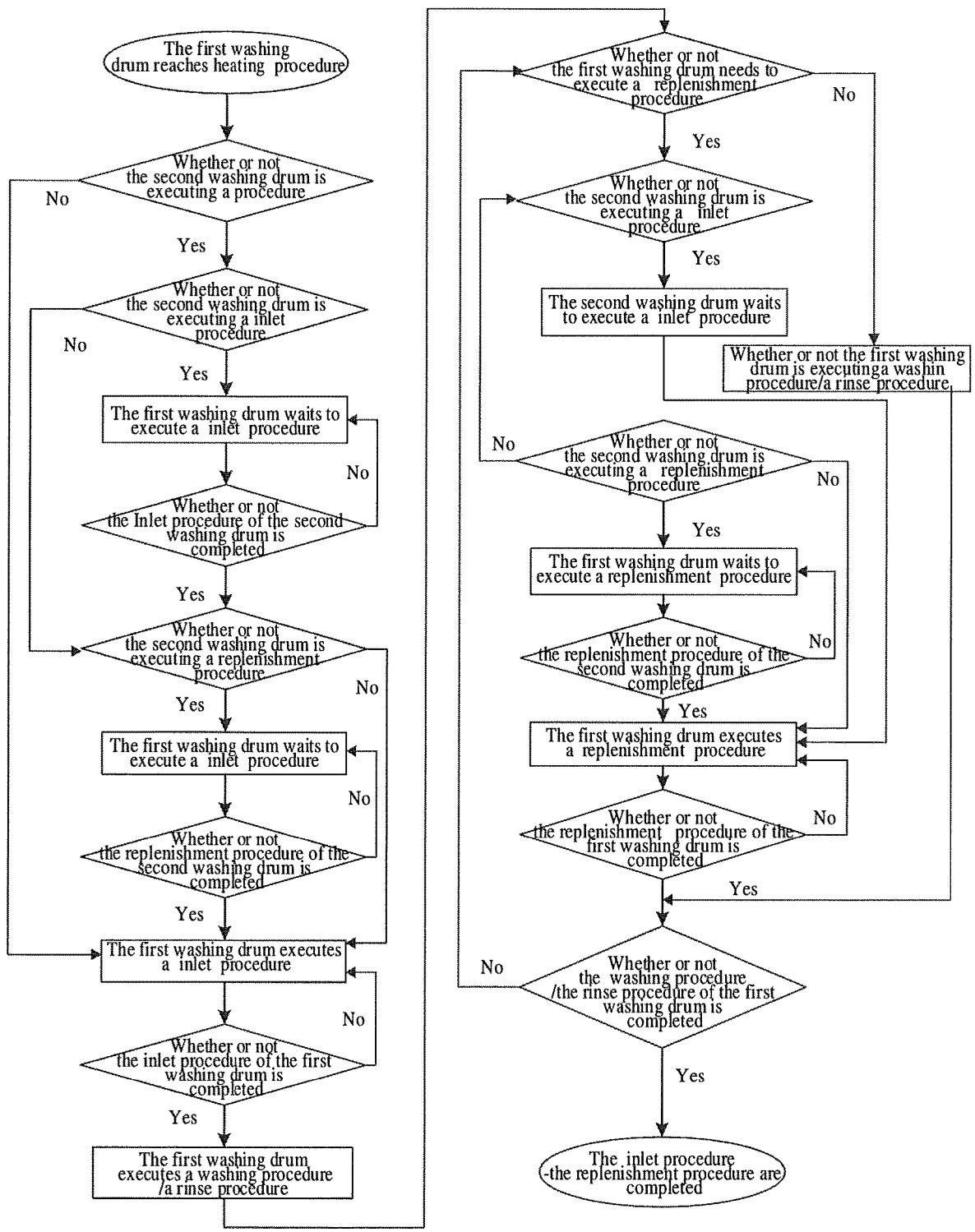
FIG. 4 is a flow chart of the water supply-replenish process of the present disclosure.

As shown in FIG. 4, in the present embodiment, the water supply-replenish control method of the multi-drum washing machine is as follows:

1) Before the first washing drum performs the water supply process;

2) It is determined whether or not the second washing drum is performing the water supply process,
if yes, executes step 4), if no, executes step 3);

3) It is determined whether or not the second washing drum is performing the water replenishment process,
if yes, executes step 4), if no, executes step 5);

4) The first washing drum stops performing the water supply process, and executes step 5) after the water supply or water replenishment process of the second washing drum is completed;

5) The first washing drum performs the water supply process until the water supply process is completed;

6) The first washing drum performs the washing process;

7) If the water level of the washing water in the first washing drum is lower than the set water level during the washing process, executes step 8);

8) The first washing drum performs the water replenishment process;

9) It is determined whether or not the second washing drum is performing the water supply process,
if yes, executes step 13), if no, executes step 10);

10) It is determined whether or not the second washing drum is performing the water replenishment process,
if yes, executes step 11), if no, executes step 12);

11) The first washing drum stops performing the water replenishment process, and executes step 12) after the water replenishment process of the second washing drum is completed;

12) The first washing drum performs the water replenishment process, and ends the replenishment process after the washing water in the first washing drum reaches the set water level;

13) The second washing drum stops performing the water supply process, and the first washing drum performs the water replenishment process, then the second washing drum continues performing the water supply process after the washing water in the first washing drum reaches the set water level.

In the present embodiment, the set water level is the set value corresponding to the washing process performed by the first washing drum. When the first washing drum is performing the water supply process, the second washing drum cannot perform the water supply or the water replenishment process at the same time. The condition which the water supply process of the first washing drum is completed is that the water level of the washing water in the first washing drum reaches the set water level.

In the present embodiment, the water replenishment control methods of the first washing drum and the second washing drum are the same. The positions of the first washing drum and the second washing drum in from steps 1) to 13) can be exchanged to obtain a water replenishment control method of the second washing drum.

In the steps from 1) to 13) in the present embodiment, the following special cases exist:

Special case 1, when the first washing drum is performing the water supply process and if the second washing drum needs to perform the water replenishment process, the first washing drum waits and the second washing drum performs the water replenishment process normally. After the water replenishment process of the second washing drum is completed, the first washing drum continues performing the water supply process. Thus, it makes the washing drum with less washing time have priority to operate, and reduce the waiting of users, and improves the humanity of the whole apparatus.

Special case 2, when the first washing drum is performing the water replenishment process and if the second washing drum needs to perform the water replenishment process, the second washing drum has priority to perform the water replenishment process according to the principle of sequence. After the water replenishment process of the second washing drum is completed, the first washing drum continues performing the water supply process. Thus, it avoids the water supply-replenish of the second washing drum and the first washing drum from performing alternately. It reduces on-off times of the water inlet valve and is good for simplifying the control program of the washing machine.

What's more, the washing machine can only issue either one water supply order or one water replenishment order at any time point. The order can only control either the first washing drum or the second washing drum to perform the water supply process or the water replenishment process. Thus, the control unit of the washing machine can issue only one order of water supply or water replenishment to the first washing drum or the second washing drum at one-time point. It avoids the situation which the first washing drum and the second washing drum perform the water supply or the water replenishment process at the same time from happening.

Sensors for detecting water level of washing water are respectively provided on the first washing drum and the second washing drum. When the first washing drum and the second washing drum begins to perform the water supply process, the water inlet valve remains open until the sensor detects the washing water reaches the set water level and then the water inlet valve close, and the water supply process is completed. When the water level of the washing water in the first washing drum or the second washing drum is lower than the set water level, and when the first washing drum or the second washing drum begins to perform the water replenishment process, the water inlet valve remains open until the sensor detects the washing water reaches the set water level, and then the water inlet valve close, the water replenishment process is completed.

In the present embodiment, the determination condition for determining whether or not the first washing drum and the second washing drum are performing the water supply process or the water replenishment is, whether or not the water inlet valves corresponding to the first washing drum and the second washing drum are open.

The way to determine whether or not the water inlet valve is open is: when an order that the water inlet valve last received is an order to open, the water inlet valve is determined as open; when an order that the water inlet valve last received is an order to close, the water inlet valve is determined as closed. When the water level of the washing water detected by the water level sensor provided on the first washing drum or the second washing drum is lower than the set water level, the first washing drum or the second washing drum begins to perform the water supply process or the water replenishment process. Now, it begins to execute the relevant steps from step 1) to step 13) in the present embodiment to determine whether or not the first washing drum or the second washing drum begins to perform water supply or water replenishment process. When the first washing drum or the second washing drum needs to begin to perform the water supply or water replenishment process, the control unit of the washing machine send open signal to the water inlet valve and the water inlet valve is at an open state. During the water supply or water replenishment process, and when the water level sensor detects the water level of the washing water corresponding to the washing drum reaches the set water level, the sensor sends close signal to the corresponding water inlet valve, and the water inlet valve is at a close state.

Or, the way to determine whether or not the water inlet valve is open is to determine whether or not there is water flowing through the corresponding water inlet valve. When there is, water flowing through the water inlet valve, the water inlet valve is at open state. When there isn't, water flowing through the water inlet valve, the water inlet valve is at close state. Water flow sensors for detecting the quantity of water flowing through corresponding water inlet valve are respectively provided on the water inlet valves of the first washing drum and the second washing drum. When the water flow sensor detects the presence of water flowing through the sensor, the corresponding water inlet valve is determined as open, otherwise, the corresponding water inlet valve is at close state.

Or, the way to determine whether or not the water inlet valve is open is to determine whether or not an open time of the water inlet valve is reaching the set time. When the open time of the water inlet valve reaches the set time, the water inlet valve is at close state. When the open time of the water inlet valve does not reach the set time, the water inlet valve is at open state. A timer is provided on the washing machine, when the water inlet valve receives the open signal, the timer begins to time. The water inlet valve remains open before the timer reaches the set time. The water inlet valve is closed when the timer reaches the set time.

In the present embodiment, preferably, the water inlet valve of the first washing drum and the water inlet valve of the second washing drum are provided with interlock means to interlock with each other. So that when the water inlet valve of the first washing drum is in the open state, the water inlet valve of the second washing drum cannot open; when the water inlet valve of the second washing drum is in the open state, the water inlet valve of the first washing drum cannot open. Thus, the occurrence of the simultaneous opening of the water inlet valve of the first washing drum and the second washing drum is avoided. Of course, the interlock device also has a third state in which the water inlet valves of the first and second washing drums are in a closed state.

Embodiment 6

In the present embodiment, in order to save the water amount consumed by the washing machine, the first washing drum and the second washing drum are communicated with each other. It is possible to make the washing water discharged from the first washing drum and satisfying the cleanliness flow into the second washing drum and be reused as water resource for water supply or water replenishment. It is also possible to make the washing water discharged from the second washing drum and satisfying the cleanliness flow into the first washing drum and be reused as water resource for water supply or water replenishment.

Therefore, the following determination is added on the basis of embodiment 5 above: before performing step 2) in the embodiment 5, it is necessary to determine whether or not the second washing drum is performing or about to perform the drainage process. If no, the first washing drum performs the water supply process or the water replenishment process directly by using clean water as water resource. If yes, it is determined whether or not the washing water in the second washing drum can be reused; if yes, the first washing drum pauses performing the water supply process or the water replenishment process, and the washing water in the second washing drum used as water resource of the water supply or the water replenishment flows into the first washing drum when the second washing drum begins to drain.

In the present embodiment, the determination condition of whether or not the second washing drum is about to perform the drainage process is, whether or not the remaining time for the second washing drum to reach a next drainage process is smaller than a set time. If yes, the first washing drum pauses performing the water supply process or the water replenishment process, and the washing water in the second washing drum flows into the first washing drum to reuse when the second washing drum begins to drain. If no, the second washing drum supplies clean water directly.

In the present embodiment, the determination condition of whether or not the washing water in the second washing drum can be reused is that, a turbidity value or a bubble concentration value of the water in the second washing drum is detected. If the turbidity value or the bubble concentration value of the water is smaller than a set value, the water in the second washing drum can be reused. Otherwise the water in the second washing drum cannot be reused.

Embodiment 7

Figure 5:
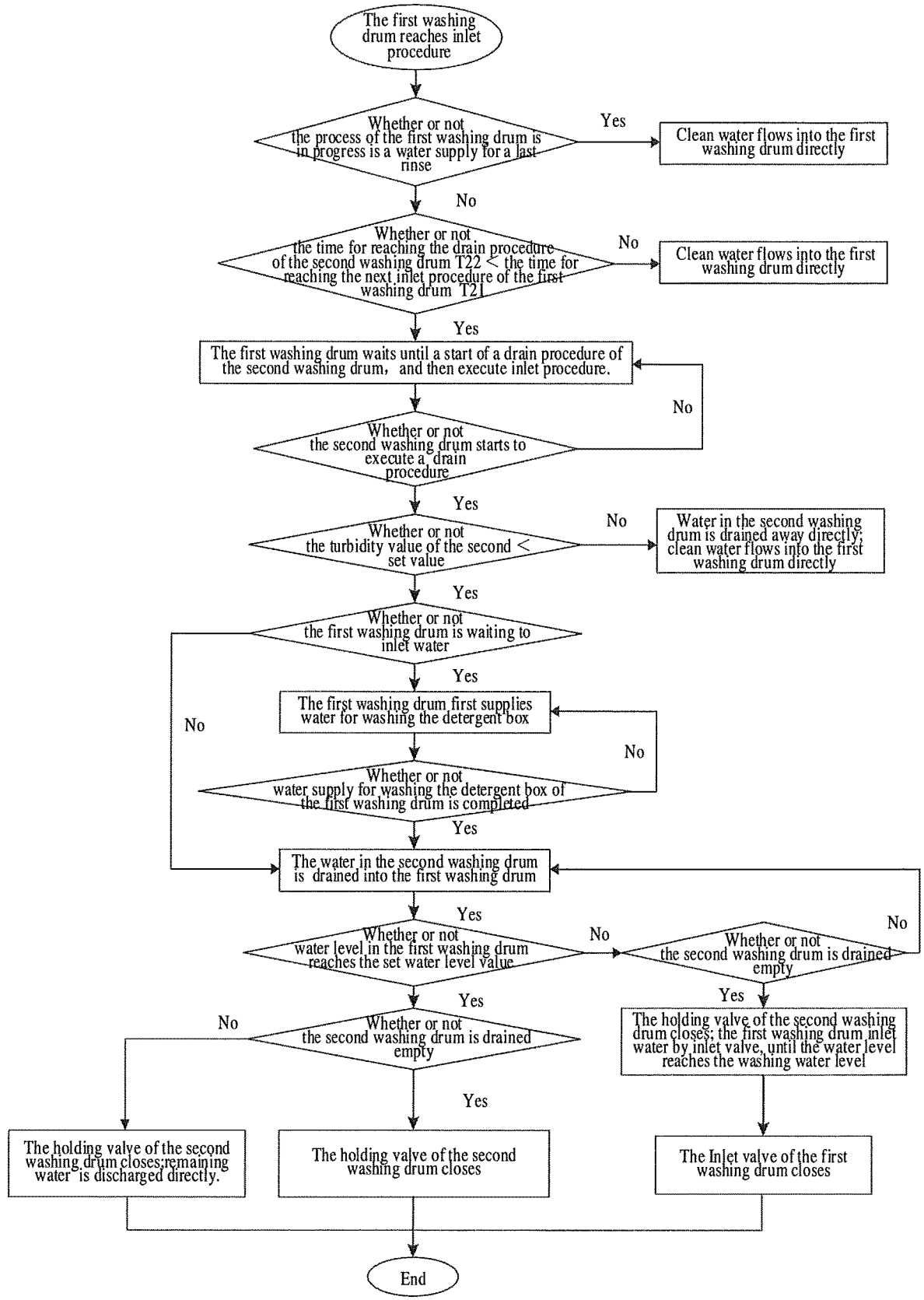
FIG. 5 is a flow chart of water reuse of the present disclosure.

As shown in FIG. 5, the present embodiment uses a waiting time of the water supply as a determination criterion to determine whether or not to reuse the water. According to the waiting time of water supply, it is determined whether to reuse water drained from the other washing drum when one washing drum reaches the water supply process. The method has a simple judgment and control logic; the control stability is high in the actual washing process. At the same time, it achieves a full reuse of water, and the practical value is high, which is more effective to promote and apply.

The determination of whether or not the water can be reused in the present embodiment, can be combined with the determination of the water supply-replenish process described in embodiment 5, to determine whether or not the discharged water from the washing drum can be reused as water resource of the water supply or the water replenishment by another washing drum. Thus, it can achieve the purpose of reusing the washing water.

When the first washing drum and the second washing drum are both in the working state at the same time, the water reuse control method is as follows:

A water reuse control method of a multi-drum washing machine is provided, and the multi-drum washing machine at least comprises a first washing drum and a second washing drum. When the first washing drum and the second washing drum are both in the working state at the same time, the water reuse control method is as follows: when the first washing drum reaches the water supply process, it is compared a time $T_{22}$ for reaching a drainage process of the second washing drum and a time $T_{21}$ for reaching a next water supply process of the first washing drum. If $T_{22} \geq T_{21}$, the first washing drum supplies clean water directly. If $T_{22} < T_{21}$, the first washing drum waits until a start of the drainage process of the second washing drum.

It is determined whether or not the water in the second washing drum can be reused before comparing the time $T_{22}$ for reaching the drainage process of the second washing drum and the time $T_{21}$ for reaching the next water supply process of the first washing drum. If no, the water in the first washing drum supplies clean water directly. If yes, it is compared the time $T_{22}$ for reaching the drainage process of the second washing drum and the time $T_{21}$ for reaching the next water supply process of the first washing drum. Or, it is determined whether or not the water in the second washing drum can be reused when the first washing drum waits until the start of the drainage process of the second washing drum. If no, the first washing drum supplies clean water directly. If yes, the water in the second washing drum is drained into the first washing drum for reusing.

Specific:

step 1: when the first washing drum reaches the water supply process, it is compared the time $T_{22}$ for reaching the drainage process of the second washing drum and the time $T_{21}$ for reaching the next water supply process of the first washing drum. If $T_{22} \geq T_{21}$, the first washing drum supplies clean water directly. If $T_{22} < T_{21}$, the first washing drum waits until a start of the drainage process of the second washing drum, execute step 2;

Step 2: it is determined whether or not the water in the second washing drum can be reused. If yes, the water in the second washing drum is drained into the first washing drum to reuse; if no, the first washing drum supplies clean water directly. By adding the process of the determination of whether or not to wait, to a large extent it increases the water reuse probability of the second washing drum, and more water can be reused.

In step 1, if the second washing drum is draining water when the first washing drum reaches the water supply process, the time $T_{22}$ for reaching the drainage process of the second washing drum is 0, and no need to wait, and directly executes step 2. It is also possible to first determine whether or not the second washing drum is currently performing the drainage process before comparing the time $T_{22}$ for reaching the drainage process of the second washing drum and the time $T_{21}$ for reaching the next water supply process of the first washing drum. If the second washing drum is not subjected to the drainage process, then it is compared the time $T_{22}$ for reaching the drainage process of the second washing drum and the time $T_{21}$ for reaching the next water supply process of the first washing drum.

In step 1, an allowable waiting time $T_2$ is set, which $T_2 < T_{21}$. If $T_{22} < T_2$, the first washing drum waits until the second washing drum drains, and executes step 2. If $T_{22} \geq T_2$, the first washing drum supplies clean water directly. This step can avoid the first washing drum waiting too long and reasonably arrange the water reuse under the premise of ensuring the washing time of the first washing drum. Thus, it will not waste too much time of the first washing drum because of only considering water reuse. If the washing machine determines that the waiting time is too long and exceeds the set allowable waiting time, the first washing drum will not reuse the water in the second washing drum. The determination makes the reuse of water more reasonable, optimizing the relationship between waiting time and water reuse to a large extent.

In step 2, the turbidity value or the bubble concentration value of the water in the second washing drum is detected. If the turbidity value or the bubble concentration value of the water is smaller than the set value, the water in the second washing drum can be reused. Otherwise the water in the second washing drum cannot be reused. Water can be reused when the turbidity value or bubble concentration value of the water is within the set range.

In step 1, when the first washing drum reaches the water supply process, it is determined whether or not the water supply process being executed is a water supply for a last rinse. If yes, the first washing drum supplies clean water directly. If no, it is continued to compare the time $T_{22}$ for reaching the drainage process of the second washing drum and the time $T_{21}$ for reaching the next water supply process of the first washing drum. Thus it is ensured that the water supplied-in in the last rinse process is clean water, which ensures that the effect of washing clothes after washing.

In step 2, before the water in the second washing drum is drained into the first washing drum, it is determined whether or not the first washing drum executes the water supply process for washing. If yes, the first washing drum first supplies water for washing the detergent box. After the completion of water supply for washing the detergent box of the first washing drum, the water in the second washing drum is drained into the first washing drum. If no, the water in the second washing drum is drained into the first washing drum directly.

In step 2, when the water in the second washing drum is drained into the first washing drum, the height of the water level in the first washing drum is detected. If the water level in the first washing drum reaches the set water level value and there is water in the second washing drum, the remaining water in the second washing drum is discharged directly. If the water in the second washing drum is entirely drained into the first washing drum and the water level in the first washing tub does not reach the set water level value, then the first washing drum supplies clean water.

Before the water in the second washing drum is drained away directly, it is determined whether or not the first washing drum is performing the dehydration process. If yes, the second washing drum waits until the dehydration process of the first washing drum is completed, and then drains. If no, it is determined a time for reaching the dehydration process of the first washing drum is $T_{41}$, a time taken for the first washing drum to dehydrate is $T_{44}$, and an allowable waiting time $T_4$ is set. If $T_{41}+T_{44} < T_4$, the second washing drum waits until the dehydration process of the first washing drum is completed, and then drains. Otherwise, the water of the second washing drum is drained directly.

It is also possible to determine whether or not the water in the first washing drum can be reused by determining the washing state and the washing times. In step 2, the water in the first washing drum cannot be reused, if the second washing drum is in a washing process when it drains and the first washing drum is in a rinse process when it supplies water; or if the first, second washing drums are both in the washing process when the second washing drum drains and the first washing drum supplies water, and washing times of the second washing drum is less than washing times of the first washing drum; or if the first, second washing drums are both in the rinse process when the second washing drum drains and the first washing drum supplies water, and rinsing times of the second washing drum is less than rinsing times of the first washing drum.

When the second washing drum reaches the water supply process, it is compared the time for reaching the drainage process of the first washing drum and the time for reaching the next water supply of the second washing drum, and it is determined whether or not the second washing drum waits until the first washing drum drains.

The drainage outlet of the second washing drum is communicated with the first washing drum, and the water in the second washing drum can be drained into the first washing drum to reuse. The drainage outlet of the second washing drum is provided with a holding valve, the water in the second washing drum can flow through the holding valve into the first washing drum. The first washing drum is provided with an inlet valve and the clean water outside can flow into the first washing drum through the inlet valve. The control method is as follows:

1) The first washing drum reaches the water supply process,

2) It is determined whether or not the water in the second washing drum can be reused, if yes, execute step 3), if no, execute step 6), 3) It is determined a time $T_{21}$ for reaching a next water supply process of the first washing drum, a time $T_{22}$ for reaching a drainage process of the second washing drum, if $T_{22} < T_{21}$, execute step 4), if $T_{22} \geq T_{21}$, execute step 6), 4) The first washing drum waits until the second washing drum drains, execute step 5), 5) The water in the second washing drum is drained into the first washing drum, 6) The first washing drum supplies clean water directly and the water in the second washing drum is drained away directly.

The control method can also add a process of determining whether or not the second washing drum is draining water before comparing the time $T_{22}$ for reaching the drainage process of the second washing drum and the time $T_{21}$ for reaching the next water supply process of the first washing drum. The control method is as follows:

1) The first washing drum reaches the water supply process,

2) It is determined whether or not the water in the second washing drum can be reused, if yes, execute step 3), if no, execute step 7), 3) It is determined whether or not the second washing drum is performing the drainage process, if no, execute step 4), if yes, execute step 6), 4) It is determined a time $T_{21}$ for reaching a next water supply process of the first washing drum, a time $T_{22}$ for reaching a drainage process of the second washing drum, if $T_{22} < T_{21}$, execute step 5), if $T_{22} \geq T_{21}$, execute step 7), 5) The first washing drum waits until the second washing drum drains, executes step 6), 6) The water in the second washing drum is drained into the first washing drum, 7) The first washing drum supplies clean water directly and the water in the second washing drum is drained away directly.

The control method may also include determining whether or not the first washing drum has enough time to wait the second washing drum draining, the control method is as follows:

1) The first washing drum reaches the water supply process,

2) It is determined whether or not the water in the second washing drum can be reused, if yes, execute step 3), if no, execute step 8), 3) It is determined whether or not the second washing drum is performing the drainage process, if no, execute step 4), if yes, execute step 7), 4) It is determined a time $T_{21}$ for reaching a next water supply process of the first washing drum, a time $T_{22}$ for reaching a drainage process of the second washing drum, if $T_{22}<T_{21}$, execute step 5), if $T_{22}\geq T_{21}$, execute step 8), 5) an allowable waiting time $T_2$ is set, if $T_{22}<T_2$, execute step 6), if $T_{22}\geq T_2$, execute step 8), 6) The first washing drum waits until the second washing drum drains, execute step 7), 7) The water in the second washing drum is drained into the first washing drum, 8) The first washing drum supplies clean water directly and the water in the second washing drum is drained away directly.

If the water in the second washing drum is too dirty or water supply process of the first washing drum is for the last rinse, the water in the second washing drum cannot be reused. The control method is as follows:

1) The first washing drum reaches the water supply process,

2) It is determined whether or not the first washing drum has only the last rinse left, if no, execute step 3), if yes, execute step 9), 3) It is determined whether or not the second washing drum is performing drainage process, if no, execute step 4), if yes, execute step 7), 4) It is determined a time $T_{21}$ for reaching a next water supply process of the first washing drum, a time $T_{22}$ for reaching a drainage process of the second washing drum, if $T_{22}<T_{21}$, execute step 5), if $T_{22}\geq T_{21}$, execute step 9), 5) an allowable waiting time $T_2$ is set, if $T_{22}<T_2$, execute step 6), if $T_{22}\geq T_2$, execute step 9), 6) The first washing drum waits until the second washing drum supplies water, execute step 7), 7) The turbidity value or the bubble concentration value of the water in the second washing drum is detected to determine whether or not the turbidity value or the bubble concentration value is smaller than the set value, if yes, execute step 8), if no, execute step 9), 8) The water in the second washing drum is drained into the first washing drum, 9) The first washing drum supplies clean water directly and the water in the second washing drum is drained away directly.

When the water in the second washing drum is drained into the first washing drum and if the water supply of the first washing drum is for washing, the detergent box need to be washed and water level need to be detected. The control method is as follows:

1) The first washing drum reaches the water supply process,

2) It is determined whether or not the first washing drum has only the last rinse left, if no, execute step 3), if yes, execute step 12), 3) It is determined whether or not the second washing drum is performing drainage process, if no, execute step 4), if yes, execute step 7), 4) It is determined a time $T_{21}$ for reaching a next water supply process of the first washing drum, a time $T_{22}$ for reaching a drainage process of the second washing drum, if $T_{22}<T_{21}$, execute step 5), if $T_{22}\geq T_{21}$, execute step 12), 5) An allowable waiting time $T_2$ is set, if $T_{22}<T_2$, execute step 6), if $T_{22}\geq T_2$, execute step 12), 6) The first washing drum waits until the second washing drum drains water, execute step 7), 7) The turbidity value or the bubble concentration value of the water in the second washing drum is detected to determine whether or not the turbidity value or the bubble concentration value is smaller than the set value, if yes, execute step 8), if no, execute step 12), 8) It is determined whether or not the first washing drum is performing the water supply process for washing, if yes, execute step 9), if no, execute step 10), 9) The first washing drum first supplies water for washing the detergent box, after the completion of water supply for washing the detergent box of the first washing drum, execute step 10), 10) The water in the second washing drum is drained into the first washing drum, 11) It is detected the height of the water level in the first washing drum. When the water level in the first washing drum reaches the set water level value and if there is still water left in the second washing drum, the left water is drained away directly. If the water level in the first washing drum still not reaches the set water level value after the water in the second washing drum is entirely drained into the first washing drum, water from outside is flooded into the first washing drum through the water inlet.

12) The first washing drum supplies clean water directly and the water in the second washing drum is drained away directly.

In the present embodiment, the water inlet of the second washing drum is communicated with the drainage outlet of the first washing drum. The water in the first washing drum can be drained into the second washing drum for reuse. The drainage outlet of the first washing drum is provided with a holding valve and the water of the first washing drum can flow into the second washing drum through the holding valve. The second washing drum is provided with an inlet valve, clean water from outside can flow into the second washing drum through the inlet valve.

In the present embodiment, the first washing drum and the second washing drum of the present embodiment are only for the sake of convenience of the description, regardless of the order of the relationship. It may also to reuse the water in the first washing drum. However, the two washing drums cannot perform the steps mentioned above at the same time, to avoid the occurrence of causing an infinite loop of both washing drums waiting from happening.

The foregoing is merely illustrative of the preferred embodiments of the present invention and is not intended to be limiting of the present invention. While the invention has been disclosed by way of example with reference to the preferred embodiments, it is not intended to be limiting of the invention. Any person skilled in the art will, without departing from the scope of the technical solution of the present invention, may make use of the technical contents of the above-mentioned tips to make some alterations or modifications to equivalent embodiments, but without departing from the scope of the technical solution of the present invention. Any and all modifications, equivalents, and modifications of the foregoing embodiments are within the scope of the present invention without departing from the spirit of the technical solution of the present invention in accordance with the technical details of the present invention.

The invention claimed is:

1. A heating control method of a multi-drum washing machine, the washing machine including a first washing drum provided with a first heater and a second washing drum provided with a second heater, the method comprising:

before the first washing drum performs a heating process, determining whether or not the second washing drum is performing a heating process, if the second washing drum is not performing the heating process, the first washing drum performs the heating process, if the second washing drum is performing the heating process, determining whether or not a remaining heating time of the second washing drum is smaller than a set value $T_{min}$, if the remaining heating time of the second washing drum is smaller than the set value $T_{min}$, the first washing drum suspends performing the heating process, and the first washing drum does not perform the heating process until the heating process of the second washing drum is completed, if the remaining heating time of the second washing drum is larger than or equal to the set value $T_{min}$, it is compared between a remaining heating time of the first washing drum and the remaining heating time of the second washing drum, the washing drum having a shorter remaining heating time preferentially performs the heating process, and the other washing drum is followed to perform the heating process;

when the remaining heating time of the first washing drum and the second washing drum are equal, determining whether or not the remaining heating time of the washing drums is greater than a set value $T_{max}$, if the remaining heating time of the washing drums is greater than the set value $T_{max}$, an alternate heating process for alternately heating the first washing drum and the second washing drum is performed, if the remaining heating time of the washing drums is smaller than or equal to the set value $T_{max}$, a sequential heating process, in which the second washing drum heats first, then the first washing drum heats, is performed.

2. The method according to claim 1, comprising:
when the first washing drum is performing the heating process, the second washing drum is controlled not to perform any of processes in heating, dehydration and drying processes.

3. The method according to claim 1, comprising:
determining whether or not the second washing drum is performing a dehydration process or a drying process after determining the second washing drum is not performing the heating process, if the second washing drum is performing the dehydration process or the drying process, the first washing drum suspends performing the heating process, and continues performing the heating process after the dehydration process or the drying process of the second washing drum is completed, if the second washing drum is not performing the dehydration process nor the drying process, the first washing drum performs the heating process directly.

4. The method according to claim 3, comprising:
when the remaining heating time of the first washing drum and the second washing drum are equal, determining whether or not the remaining heating time of the washing drums is greater than a set value $T_{max}$, if yes, an alternate heating process for alternately heating the first washing drum and the second washing drum is performed, if no, a sequential heating process, in which the second washing drum heats first, then the first washing drum heats, is performed.

5. The method according to claim 3, wherein, a total heating time of the second washing drum is $T_{m2}$, the set value $T_{max}$ satisfies a following condition, $\frac{2}{3}T_{m2} \leq T_{max} \leq T_{m2}$.

6. The method according to claim 3, wherein, the total heating time of the second washing drum is $T_{m2}$, the set value $T_{min}$ satisfies a following condition, $0 < T_{min} \leq \frac{1}{3}T_{m2}$.

7. The method according to claim 1, comprising:
when the first washing drum is performing the heating process, and the second washing drum is performing a dehydration process, the first washing drum suspends performing the heating process and continues performing the heating process after the dehydration process and a followed drying process of the second washing drum are completed.

8. The method according to claim 7, comprising:
when the remaining heating time of the first washing drum and the second washing drum are equal, determining whether or not the remaining heating time of the washing drums is greater than a set value $T_{max}$, if yes, an alternate heating process for alternately heating the first washing drum and the second washing drum is performed, if no, a sequential heating process, in which the second washing drum heats first, then the first washing drum heats, is performed.

9. The method according to claim 7, wherein, a total heating time of the second washing drum is $T_{m2}$, the set value $T_{max}$ satisfies a following condition, $\frac{2}{3}T_{m2} \leq T_{max} \leq T_{m2}$.

10. The method according to claim 7, wherein, the total heating time of the second washing drum is $T_{m2}$, the set value $T_{min}$ satisfies a following condition, $0 < T_{min} \leq \frac{1}{3}T_{m2}$.

11. The method according to claim 1, wherein, in the alternate heating process, the first washing drum and the second washing drum are alternately heated for certain time intervals, and after a completion of heating of each time interval, the method comprises determining whether or not the heating processes of the first washing drum and the second washing drum are completed, if the heating process of the first washing drum or the second washing drum is completed, the second washing drum or the first washing drum keeps heating until to an end, otherwise, keeps alternately heating.

12. The method according to claim 1, wherein, a total heating time of the second washing drum is $T_{m2}$, a set value $T_{max}$ satisfies a following condition, $\frac{2}{3}T_{m2} \leq T_{max} \leq T_{m2}$.

13. The method according to claim 12, wherein, the 10min $< T_{max}$.

14. The method according to claim 1, wherein, the total heating time of the second washing drum is $T_{m2}$, the set value $T_{min}$ satisfies a following condition, $0 < T_{min} \leq \frac{1}{3}T_{m2}$.

15. The method according to claim 14, wherein, the $0 < T_{min} \leq 5_{min}$.

16. The method according to claim 1, wherein, a heating time of the first washing drum or the second washing drum is a corresponding set value of the washing process performed by a corresponding washing drum, the washing machine times the heating process performed by the first washing drum or the second washing drum to obtain a heated time corresponding to the washing drum, and according to an equation, remaining heating time=total heating time−heated time, to obtain the remaining heating time of the first washing drum or the second washing drum.

17. The method according to claim 1, comprising:
when the first washing drum is performing the heating process, determining whether the second washing drum is operating,
if no, the first washing drum performs the heating process directly,
if yes, determining whether or not the second washing drum is performing the heating process.

18. The method according to claim 1, wherein, a total heating time of the second washing drum is $T_{m2}$, the set value $T_{max}$ satisfies a following condition, $\frac{2}{3}T_{m2} \leq T_{max} \leq T_{m2}$.

19. The method according to claim 1, wherein, the total heating time of the second washing drum is $T_{m2}$, the set value $T_{min}$ satisfies a following condition, $0 < T_{min} \leq \frac{1}{3}T_{m2}$.

* * * * *